(12) United States Patent
Asahi et al.

(10) Patent No.: US 6,368,696 B1
(45) Date of Patent: *Apr. 9, 2002

(54) PATTERNED THICK LAMINATED FILM FORMING METHOD AND TRANSFER SHEET

(75) Inventors: Koichi Asahi; Katsuhiko Mizuno; Takeshi Nakamura; Shoji Takeshige; Shinichi Sakano; Takashi Miyama; Yasutomo Teshima, all of Tokyo-To (JP)

(73) Assignee: Dai Nippon Printing Co., Toyko-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,961

(22) Filed: Apr. 3, 1998

(30) Foreign Application Priority Data

Apr. 9, 1997 (JP) .............................. 9-090925
Apr. 9, 1997 (JP) .............................. 9-090926

(51) Int. Cl.$^7$ .............................. B32B 27/14; B32B 3/00
(52) U.S. Cl. .............................. 428/195; 428/913
(58) Field of Search .............................. 428/195, 913; 347/217, 171; 402/47; 216/54; 361/746

(56) References Cited

U.S. PATENT DOCUMENTS

| | | | | |
|---|---|---|---|---|
| 4,494,824 A | * | 1/1985 | Nakamura et al. | 350/334 |
| 4,984,823 A | * | 1/1991 | Ishii et al. | 283/81 |
| 4,992,413 A | * | 2/1991 | Egashira et al. | 503/227 |
| 5,078,427 A | * | 1/1992 | Ishii et al. | 283/81 |
| 5,354,401 A | * | 10/1994 | Asahi et al. | 156/230 |
| 5,518,843 A | * | 5/1996 | Hara et al. | 430/13 |
| 5,622,794 A | * | 4/1997 | Sato et al. | 430/7 |
| 5,665,472 A | * | 9/1997 | Tanaka et al. | 428/402 |
| 5,712,673 A | * | 1/1998 | Hayashi et al. | 347/217 |
| 5,738,970 A | * | 4/1998 | Hsieh et al. | 430/259 |
| 5,992,320 A | * | 11/1999 | Kosaka et al. | 101/401.1 |

* cited by examiner

Primary Examiner—Cynthia H. Kelly
Assistant Examiner—B. Shewareged
(74) Attorney, Agent, or Firm—Morgan & Finnegan LLP

(57) ABSTRACT

A plurality of component layers of thick film forming materials are formed simultaneously on a glass substrate by simultaneously applying a plurality of thick film forming pastes to the glass substrates, or by simultaneously transferring the plurality of component layers of thick laminated film formed on a transfer base sheet from the transfer base sheet to the glass substrate. At least one of the plurality of component layers formed on the glass substrate is patterned, and then the plurality of component layers are burned simultaneously to form a patterned thick laminated film on the glass substrate.

6 Claims, 4 Drawing Sheets

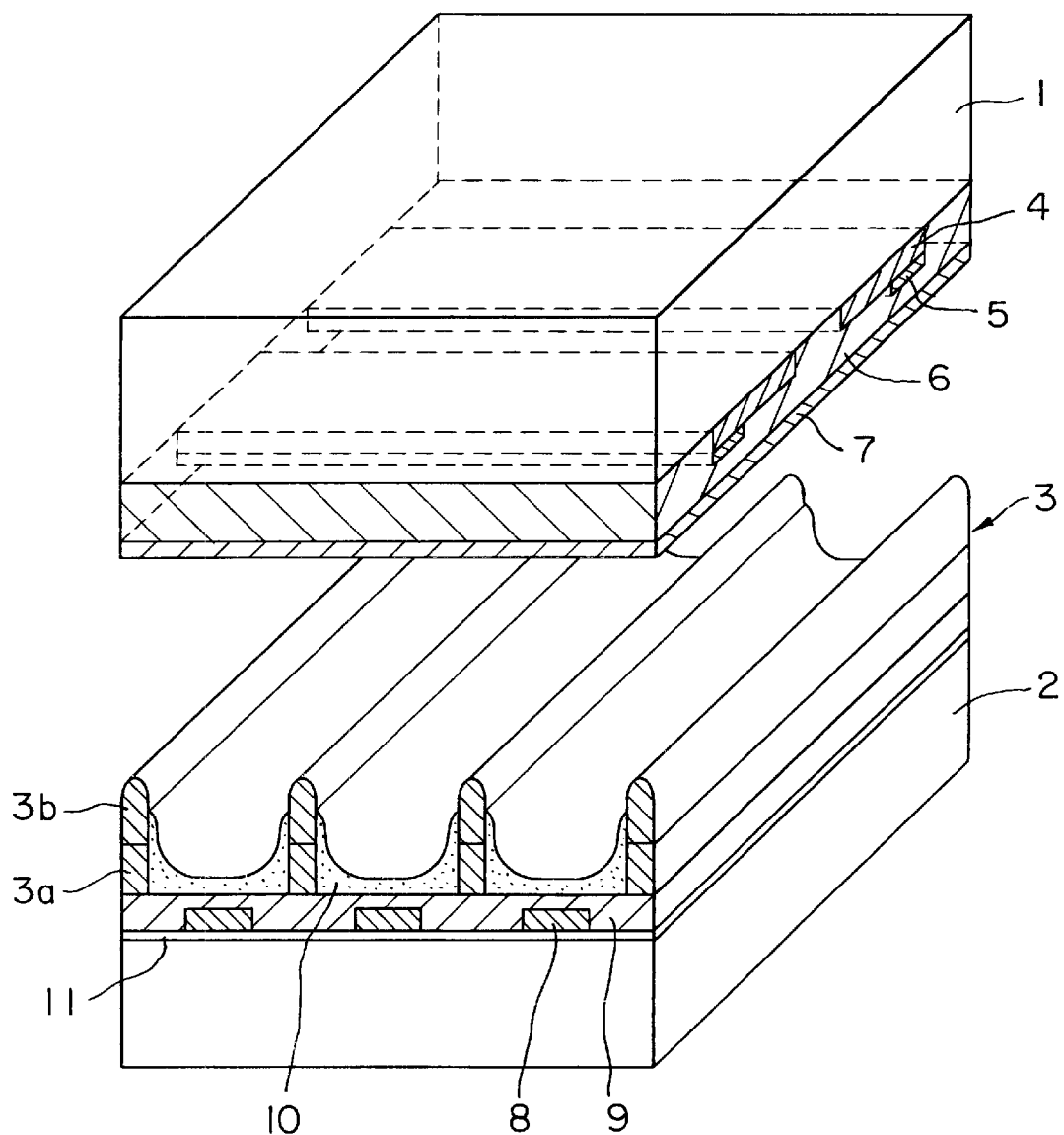
F I G. 1

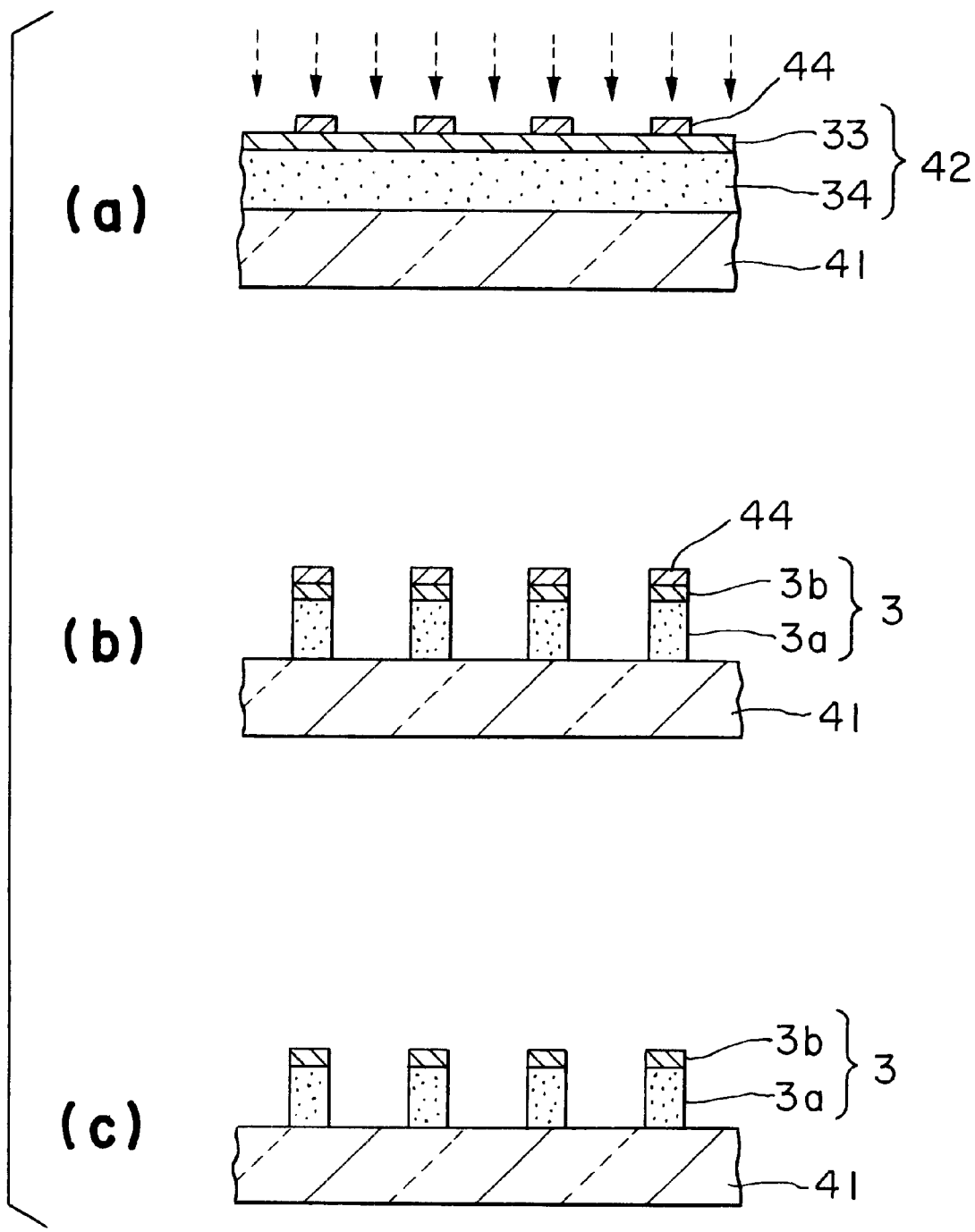
F I G. 6

PATTERNED THICK LAMINATED FILM FORMING METHOD AND TRANSFER SHEET

BACKGROUND OF THE INVENTION

1. Field of the Invention

The present invention relates to a method of forming A patterned thick laminated film on a substrate in processes of fabricating plasma display panels (PDPs), field emission displays (FEDs), liquid crystal displays (LCDs), fluorescent displays and hybrid integrated circuits, and a transfer sheet.

2. Description of the Related Art

A conventional patterned thick laminated film forming method of this sort prints a conductive or an insulating paste in a patterned thick laminated film by a screen printing process on a substrate, such as a glass substrate or a ceramic substrate, and bonds the patterned thick laminated film to the substrate by a burning process. Forming fine lines of, for example, 100 μm in width and 100 μm in height by this method, the screen printing process needs to be repeat several times.

However, the method requiring the repetition of the screen printing process to form the patterned thick laminated film is disadvantageous in respect of productivity, and cannot form the patterned thick laminated film in a satisfactory pattern because it is possible that component thin films are not superposed in correct register due to the elongation of the screen during the repetition of the screen printing process. Furthermore, the method has a problem that the same cannot form a patterned thick laminated film having a high aspect ratio because the spread of the lower edges of the patterned thick laminated film due to the flow of the flowable printing paste. Since the screen printing process is carried out by an open system, it is difficult to manage process conditions for the screen printing process to prevent problems, such as the contamination of the patterned thick laminated film with foreign matters.

SUMMARY OF THE INVENTION

The present invention has been made in view of the foregoing problems and it is therefore an object of the present invention to provide a patterned thick laminated film forming method capable of easily and simply forming a thick laminated film of a desired pattern on a substrate, and to provide a transfer sheet.

According to a first aspect of the present invention, a patterned thick laminated film forming method comprises the steps of forming a thick laminated film consisting of a plurality of component layers of thick film forming materials on a substrate by applying a plurality of thick film forming pastes to the substrate, drying the plurality of component layer of the thick laminated film, patterning at least one of the component layers of the thick laminated film in a desirable pattern, and burning the plurality of component layers of the thick laminated film formed on the substrate.

According to a second aspect of the present invention, a patterned thick laminated film forming method comprises the steps of forming a thick laminated film consisting of a plurality of component layers of thick film forming materials on a transfer base film by applying a plurality of thick film forming pastes to the transfer base film;

drying the plurality of component layers of the thick laminated film, transferring the thick laminated film consisting of the plurality of component layers from the transfer base film to a substrate, patterning at least one of the component layers of the thick laminated film in a desired pattern; and burning the plurality of component layers of the thick laminated film formed on the substrate.

According to a third aspect of the present invention, a patterned thick laminated film forming method comprises the steps of forming a thick laminated film consisting of a plurality of component layers of thick film forming materials on a transfer base film by applying a plurality of thick film forming pastes to the transfer base film, drying the plurality of component layers of the thick laminated film, patterning at least one of the component layers of the thick laminated film formed on the transfer base sheet in a desired pattern, transferring the thick laminated film consisting of the plurality of component layers from the transfer base film to a substrate, and burning the plurality of component layers of the thick laminated film formed on the substrate.

According to a fourth aspect of the present invention, a transfer sheet comprises a transfer base film, and a thick laminated film on the transfer base film, consisting of a plurality of component layers of thick film forming materials formed by applying a plurality of thick film forming pastes to the transfer base film.

BRIEF DESCRIPTION OF THE DRAWINGS

FIG. 1 is a typical, exploded perspective view of an ac-drive plasma display panel, in which a front plate and a back plate are spaced apart;

FIGS. 6(a), 6(b) and 6(c) are fragmentary typical sectional views of assistance in explaining a procedure for forming barrier walls on a glass substrate by using the barrier forming transfer sheet.

DESCRIPTION OF THE PREFERRED EMBODIMENTS

First Embodiment

Figure 2:
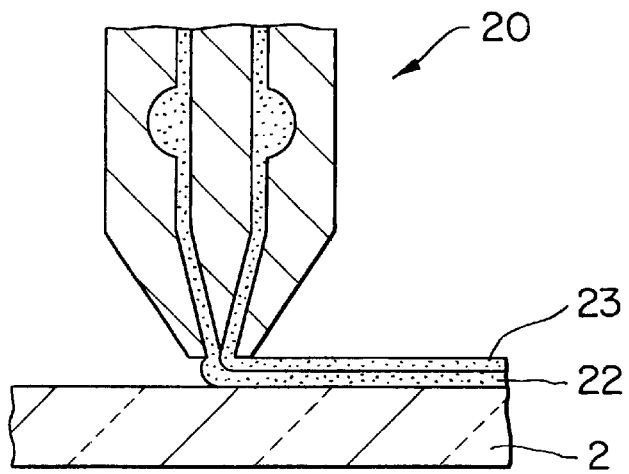
FIG. 2 is a sectional view of assistance in explaining a process of simultaneously applying a plurality of kinds of thick film forming materials to a glass substrate by a simultaneous multilayer coating apparatus.

A patterned thick laminated film forming method in a first embodiment will be described with reference to FIGS. 1 to 3 as applied to fabricating a plasma display panel (PDP) as a typical example of a structure provided with a patterned thick laminated film.

Generally, a PDP is formed by arranging first electrodes and second electrodes in pairs in a regular arrangement on a first glass substrate and a second glass substrate, respectively, disposing the glass substrates opposite to each other with a space therebetween, and sealing a gas containing Ne gas or Xe gas as a principal component in the space between the first and the second glass substrate. Voltage is applied selectively to the pairs of electrodes to produce discharges in regularly arranged minute cells around the pairs of electrodes so that the minute cells emit light for information display. PDPs are classified into dc-drive PDPs in which electrodes are exposed to a discharge space, and ac-drive PDPs in which electrodes are coated with an insulating layer. Both dc-drive PDPs and ac-drive PDPs are classified into refresh-drive PDPs and memory-drive PDPs by displaying function and driving method.

Referring to FIG. 1 showing an ac-drive PDP in an exploded perspective view, a first glass substrate 1, which is a base plate of a front plate, and a second glass substrate 2, which is a base plate of a back plate, are disposed opposite and in parallel to each other, and are spaced a predetermined distance apart by parallel barrier walls 3 formed on the second glass substrate 2. The barrier walls 3 are white for high-luminance display or black for high-contrast display. It is desirable, for making the best use of the advantages of both high-luminance display and high-contrast display, that each barrier wall 3 has a white back section 3a on the side of the back plate, and a black front section 3b on the side of the front plate.

Composite electrodes each consisting of a transparent sustaining electrode 4 and a bus electrode 5, i.e., a metal electrode, are formed on the inner surface of the first glass substrate 1 of the front plate, a dielectric layer 6 is formed so as to cover the composite electrodes, and a protective layer 7 of MgO is formed on the dielectric layer 6. A base layer 11 is formed on the inner surface of the glass substrate 2 of the back plate, parallel address electrodes 8 are formed on the base layer 11 at positions corresponding to spaces between the barrier walls 3 so as to extend perpendicularly to the composite electrodes each of the sustaining electrode 4 and the bus electrode 5, a dielectric layer 9 is formed so as to cover the address electrodes 8, and fluorescent layers 10 are formed so as to coat the dielectric layer 9 and the side surfaces of the barriers 3. This ac-drive PDP is of a surface discharge type in which an ac voltage is applied across the composite electrodes formed on the first glass substrate 1 of the front plate, and produce discharges by an electric field created in the space between the front plate and the back plate. Since the ac voltage is applied across the composite electrodes, the direction of the electric field is altered at a frequency corresponding to the frequency of the ac voltage. The fluorescent layers 10 emit light when the same are stimulated by ultraviolet rays produced by discharge to enable an observer to recognize light passed through the front plate.

When fabricating the back plate of the ac PDP, the address electrodes 8, the dielectric layer 9 and the barrier walls 3 are formed on the second glass substrate 2 by forming thick films in patterns corresponding to the address electrodes 8, the dielectric layer 9 and the barrier walls 3. A patterned thick laminated film forming method of the present invention forms a plurality of component layers simultaneously instead of repeating a series of processes of coating, drying, patterning and burning for the plurality of layers. Patterned thick laminated film forming methods in preferred embodiments according to the present invention will be described as applied to the fabrication of a back plates for the ac-drive PDP.

A back plate is provided with barrier walls 3 each consisting of a white back section 3a and a black front section 3b. A white barrier layer 22 and a black barrier layer 23 are applied simultaneously for forming a laminated film on the inner surface of the second glass substrate 2 by a coating apparatus 20, such as a slot die coater or a curtain coater, as shown in FIG. 2. Other components of the second plate including electrodes, not shown, are formed previously on the inner surface of the second glass substrate 2.

Figure 3:
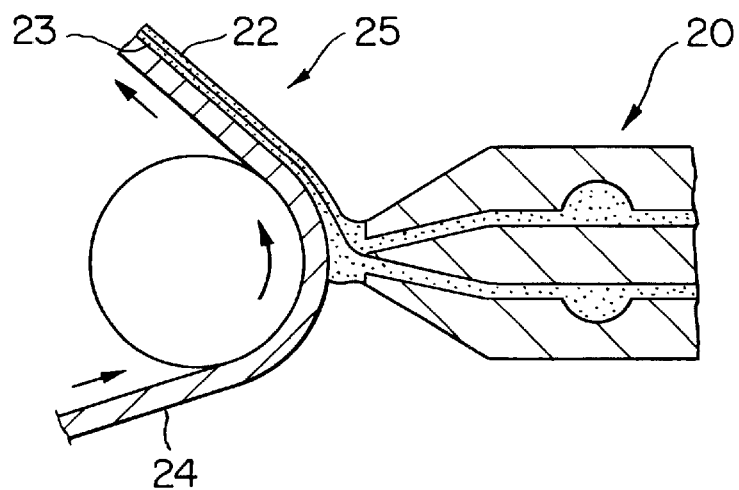
FIG. 3 is a sectional view of assistance in explaining a process of simultaneously applying a plurality of kinds of thick film forming materials to a base film by a simultaneous multilayer coating apparatus.

As shown in FIG. 2, The laminated film consisting of the white barrier layer 22 and the black barrier layer 23 may be formed by simultaneously forming the white barrier layer 22 and the black barrier layer 23 on a transfer base film 24 by a coating apparatus 20, such as a slot die coater, a curtain coater or a slide coater, so that the black barrier layer 23 underlies the white barrier layer 22 as shown in FIG. 3. Then, the laminated film of the white barrier layer 22 and the black barrier layer 23 is transferred from the transfer base film 24 to the second glass substrate 2 by a thermocompression bonding process or the like.

Then, the white barrier layer 22 and the black barrier layer 23 are patterned simultaneously by a sandblasting process using a mask resistant to sandblasting. It is also possible to pattern the white barrier layer 22 and the black barrier layer 23 by forming the black barrier layer 23 of a photosensitive material, patterning the black barrier layer 23 first by a photolithographic process and then patterning the white barrier layer 22 by a sandblasting process. If the mask resistant to sandblasting cannot be removed by burning, the mask is peeled off and then the second glass substrate 2 provided with the patterned white barrier layer 22 and the patterned black barrier layer 23 is subjected to burning.

In some cases, the white barrier layer 22, the black barrier layer 23, and the dielectric layer 9 underlying the black barrier layer 23 are formed simultaneously. Although the barrier walls 3 shown in FIG. 1 are two-layer structures consisting of the white barrier layer 22 and the black barrier layer 23, the barrier walls 3 may be single-layer structures consisting of a single barrier layer. When simultaneously forming the white barrier layer 22, the black barrier layer 23, and the dielectric layer 9 underlying the black barrier layer 23, a laminated film consisting of the white barrier layer 22, the black barrier layer 23, and the dielectric layer 9 are formed simultaneously on the second glass substrate 2 by the foregoing coating process, or the same are formed on a transfer base film 24 by the foregoing coating process in a laminated film and the laminated film is transferred from the transfer base film 24 to the second glass substrate 2. Then, the white barrier layer 22 and the black barrier layer 23 are patterned by a sandblasting process or the like. It is preferable that the sandblasting rate of the dielectric layer 9 is different from those of the white barrier layer 22 and the black barrier layer 23 to prevent the dielectric layer 9 from being patterned when patterning the white barrier layer 22 and the black barrier layer 23 by the sandblasting process. For example, the dielectric layer 9 can be formed in a layer softer and more resistant to sandblasting than the white barrier layer 22 and the black barrier layer 23 by forming the dielectric layer 9 of a material having contents of the organic components thereof, such as a binder and a plasticizer, greater than those of the organic components of the materials for forming the white barrier layer 22 and the black barrier layer 23.

In some case, the base layer 11 and a conductive layer for forming the address electrodes 8 are formed simultaneously. In such a case, the base layer 11 need not be patterned and only the conductive layer for forming the address electrodes 8 must be patterned. The base layer 11 and the conductive layer for forming the address electrodes 8, similarly to the dielectric layer 9 and the white barrier layer 22 and the black barrier layer 23, are formed simultaneously in a laminated film on the second glass substrate, or the same are formed simultaneously in a laminated film on a transfer base film 24 and the laminated film is transferred from the transfer base film 24 to the second glass substrate 2, and then only the conductive film 4 is patterned by a sandblasting process to form the address electrodes 8. It is also possible to form the address electrodes 8 by forming the conductive layer for forming the address electrodes 8 of a photosensitive material, and patterning the conductive layer by a photolithographic process.

In some case, the address electrodes 8 and the dielectric layer 9 are formed simultaneously on the second glass substrate 2. In this case, the dielectric layer 9 and a conductive layer for forming the address electrodes 8 are formed simultaneously on a transfer base film 24 by the foregoing coating process so that the dielectric layer 9 underlies the conductive film for forming the address electrodes 8. Then the conductive film is patterned by a sandblasting process or a photolithographic process to form the address electrodes 8, and then the address electrodes 8 and the dielectric layer 9 are transferred from the transfer base film 24 to the second glass substrate 2.

Finally, the base layer 11, the address electrodes 8, the dielectric layer 9 and the barrier walls 3 are bonded together by simultaneous burning. Therefore, each of thick film forming pastes for forming the base layer 11, the address electrodes 8, the dielectric layer 9 and the barrier walls 3 contains inorganic components including a low-melting frit, and a resin as binder.

For example, a barrier layer forming paste for forming the barrier walls 3 is prepared by mixing a low-melting frit having a low melting point containing PbO as a principal component, a refractory filler for stabilizing the shape of barrier layers for forming the walls 3 during burning, and a binder. A coloring pigment and, if necessary, a solvent and additives are added to the barrier layer forming paste.

The low-melting frit having a low melting point contains 50% or more PbO as a principal component. Usually, appropriate amounts of $Al_2O_3$, $B_2O_3$, $SiO_2$, MgO, CaO, SrO, BaO and the like are added to the low-melting frit to prevent the phase separation of the glass, to adjust the softening point, and to adjust the thermal expansion coefficient of the barrier walls 3 to that of the second glass substrate 2. It is preferable that the low-melting frit has a softening point in the range of 350 to 650° C. and a thermal expansion coefficient $\alpha_{300}$ in the range of $60 \times 10^{-7}/°$ C. to $10 \times 10^{-7}/°$ C. Usually, refractory fillers which are not softened at temperatures in the range of 500 to 600° C. are used. Inexpensive, suitable refractory fillers are ceramic powders of alumina, magnesia, calcia, cordierite, silica, mullite, zircon, zirconia and the like.

A dark-colored pigment is added to the low-melting frit to prepare a paste capable of providing the barrier walls 3 with a light intercepting property. Suitable dark-colored pigments are Co—Cr—Fe, Co—Mn—Fe, Co—Fe—Mn—Al, Co—Ni—Cr—Fe, Co—Ni—Mn—Cr—Fe, Co—Ni—Al—Cr—Fe, Co—Mn—Al—Cr—Fe—Si or compound oxide pigments such as metallic oxides comprising any two or more metals selected from Cr, Co, Ni, Fe, Mn, Cu, Sb, As, Bi, Ti, Cd, Al, Ca, Si, Mg and Ba, or black titanium, black iron oxide ($Fe_3O_4$). A light-colored pigment is added to the low-melting frit to prepare a paste capable of providing the barrier walls 3 with a light reflecting property. Suitable light-colored pigments are titania ($TiO_2$) and the like.

Preferably, the low-melting frit content of the inorganic part of the barrier layer forming paste is in the range of 50 to 80% by weight. An excessively large low-melting frit content affects adversely to the shape maintainability of the stricture, deteriorates binder eliminating property and reduces the density of the barrier walls. If the low-melting frit content is excessively small, voids in the refractory filler cannot be satisfactorily filled up, the density of the barrier walls is reduced, and the barrier walls may possibly be chipped when combining the front and the back plates due to the reduction of the mechanical strength of the barrier walls after burning.

The binder, i.e., the resin, contained in the barrier layer forming paste must be completely decomposed and gasified at a relatively low burning temperature so that any carbides may not remain in the barrier walls. Preferable resins as the binder are cellulose resins including ethyl cellulose, methyl cellulose, cellulose nitrate, cellulose acetate, cellulose propionate, cellulose acetate butyrate, and acrylic resins including polymers or copolymers of methyl methacrylate, ethyl methacrylate, n-butyl methacrylate, isobutyl methacrylate, isopropyl methacrylate, 2-ethyl methyl methacrylate, and 2-hydroxyethyl methacrylate. The binder may be any suitable one of photosensitive resins, and mixtures of prepolymers having polymerizing unsaturated linkages in molecules, oligomers and/or monomers. For example, any suitable one of unsaturated polyesters, such as a condensation product of unsaturated dicarboxylic acid, acrylates and methacrylates may be used as the binder, and, if ultraviolet curable resins are desired, any suitable one of those resins containing a photopolymerization initiator is used as the binder. If the barrier layers 22 and 23 are formed directly on the second glass substrate 2, the binder content of the inorganic component of the barrier layer forming paste may be in the range of about 0.5 to about 5.0% by weight. If the barrier layers 22 23 are formed on the transfer base film 24 and are transferred to the second glass substrate 2, it is preferable that the binder content of the inorganic component of the barrier layer forming paste is in the range of about 1.0 to about 20% by weight. If the binder content is excessively large, the barrier layers 22 and 23 are excessively flexible, the sandblasting rate of the barrier layers 22 and 23 is reduced. Therefore, if the barrier layers 22 and 23 are to be processed by a sandblasting process to form the barrier walls 3, it is preferable to subject the barrier layers 22 and 23 to a sandblasting process after burning the barrier layers 22 and 23 for preparatory burning at a temperature at which the binder is incinerated completely and the low-melting frit is not melted completely.

Additives, such as a plasticizer, a surface-active agent, a defoaming agent, an oxidation inhibitor and such, may be added to the barrier layer forming paste. Preferably, a plasticizer is added to the barrier layer forming paste to improve the flexibility of a film of the barrier layer forming paste. Phthalic esters, sebacic esters, phosphoric esters, adipic esters, glycol esters and citric esters are common plasticizers. Preferable weight ratio of the plasticizer to the resin is 1/5 or less. If the barrier layers 22 and 23 are formed on the transfer base film 24 and are transferred from the transfer base film 24 to the second glass substrate 2, it is preferable that the plasticizer content of the inorganic component of the barrier layer forming paste is in the range of t to 30% by weight. However, if the plasticizer content is excessively large, the flexibility of the resin increases and the sandblasting rate of the barrier layers 22 and 23 is reduced. Therefore, if the barrier layers 22 and 23 are to be processed by a sandblasting process to form the barrier walls 3, it is preferable to subject the barrier layers 22 and 23 to a sandblasting process after burning the barrier layers 22 and 23 for preparatory burning at a temperature at which the resin is incinerated completely and the low-melting frit is not melted completely.

It is preferable to use a solvent having high capability to dissolve the binder in preparing the barrier layer forming paste. Suitable solvents are terpineol, butyl Carbitol acetate and the like. A suitable solvent is chosen by taking into consideration the volatility and the binder dissolving ability of the solvent. If the solvent has poor ability to dissolve the binder, the viscosity of the coating liquid increases even if the solid content is not increased and the coating ability of the coating liquid is deteriorated. If the solvent content of the barrier layer forming paste is excessively small, the viscosity of the barrier layer forming paste is excessively high. Consequently, it is difficult to defoam the barrier layer forming paste, the barrier layers cannot satisfactorily level out and the barrier layers cannot be formed in a satisfactorily smooth surface. If the solvent content of the barrier layer forming paste is excessively large, it is difficult to stabilize the composition of the barrier layer forming paste because dispersed particles precipitate rapidly and much time and energy are necessary for drying the barrier layers 22 and 23. Therefore, a suitable solvent content of the barrier layer forming paste is in the range of 20 to 50% by weight. If the barrier layers 22 and 23 are to be formed on the transfer base film 24 and then transferred to the second glass substrate 2, a suitable solvent content of the barrier layer forming paste is in the range of 5 to 40% by weight.

A glass paste prepared by dispersing the foregoing low-melting frit in a binder is used for forming the dielectric layer 9 and the base layer 11. An electrode forming paste for forming the address electrodes 8 contains the foregoing low-melting frit, i.e., an inorganic component, a conductive powder and a thermoplastic resin. If necessary, additives, such as a thickener, are added to the electrode forming paste. The low-melting frit contains the foregoing substances. The low-melting frit of a mean particle size in the range of 0.3 to 5 μm is particularly recommendable. The conductive powder is a powder of gold, copper, nickel, aluminum or the like preferably having a mean particle size in the range of 0.15 to 5 μm. Preferably, 100 parts by weight conductive powder and 2 to 20 parts by weight low-melting frit are mixed. The binder may be any one of the foregoing resins. Preferably, the binder content of the electrode forming paste is in the range of 3 to 50% by weight, more preferably, in the range of 5 to 30% by weight.

Examples of the first embodiment will be described hereinafter as applied to forming a two-layer barrier walls for a PDP.

EXAMPLE 1

A glass substrate 2 provided with address electrodes 8 and a dielectric layer 9 was prepared. As shown in FIG. 2, in which the address electrode 8 and the dielectric layer 9 are omitted for convenience, a barrier layer forming paste of a composition A and a barrier layer forming paste of a composition B were spread simultaneously on the glass substrate 2 by a slot die coater 20 having two slots of 500 μm in width, i.e., slot width, and 1 m in length, i.e., coating width, to form a two-layer laminated barrier film consisting of two barrier layers, namely, a white barrier layer 22 contiguous with the glass substrate 2, and a black barrier layer 23 overlying the white barrier layer 22. The extrusion rate and the coating speed of the slot die coater 20 were regulated so that the white barrier layer 22 and the black barrier layer 23 after drying were 120 μm and 50 μm in thickness, respectively.

Composition A (Black barrier layer 23)

Frit: "MB-010A", Matunami Glass Industry, 65 Parts by wt.

Filler (alumina): "RA-40", Iwatani Chemical Industry, 7 Parts by wt.

Pigment: "Daipirokisaido Black #9510", Dainichiseika Color & Chemicals MFG 7 Parts by wt.

Binder: "Ethocel STD-100", Dow Chemical, 1 Part by wt.

Solvents: Diethylene glycol monobutyl ether acetate, 10 Parts by wt., Terpineol, 10 Parts by wt.

Composition B (White barrier layer 22)

Frit: "MB-010A", Matunami Glass Industry 65 Parts by wt.

Filler (alumina): "RA-40", Iwatani Chemical Industry 7 Parts by wt.

Pigment: "MT-500B, Tayca, 7 Parts by wt.

Binder: "Ethocel STD-100", Dow Chemical, 1 Part by wt.

Solvents: Diethylene glycol monobutyl ether acetate, 10 Parts by wt., Terpineol, 10 Parts by wt.

The glass substrate 2 provided with the white barrier layer 22 and the black barrier layer 23, namely, a workpiece, was heated at 80° C., a dry resist film ("BF-603", Tokyo Ohka Kogyo) was laminated to the black barrier layer 23, and the dry resist film was exposed to ultraviolet rays of 365 nm in wavelength and 5 mW/cm2 in intensity at a dose of 400 mJ/cm$^2$ through a mask provided with 80 μm wide lines arranged at pitches of 250 μm. Subsequently, an latent image formed on the dry resist film was developed by a spray developing process using a 0.2% by weight sodium carbonate solution of 30° C. to form a sandblasting mask having 80 μm wide lines arranged at pitches of 250 μm.

The glass substrate 2 provided with the barrier layers 22 and 23 and the sandblasting mask, i.e., the workpiece, was kept at a room temperature for 24 hr for drying, and then the workpiece was subjected to a sandblasting process to remove unnecessary portions of the white barrier layer 22 and the black barrier layer 23. Conditions for the sandblasting process were abrasive: "FO#800", Fujimi Inc., blasting rate: 100 g/min, blasting pressure: 2 kgf/cm$^2$, distance between the glass substrate and the blast nozzle: 120 mm, and nozzle scanning speed: 100 mm/sec. After completing the sandblasting process, the sandblasting mask was removed by a spray removing process using a 1% by weight sodium hydroxide solution. Then, workpiece was subjected to a burning process, in which the remaining portions of the barrier layers 22 and 23 were burned at temperatures having a peak temperature of 580° C. for 15 min to complete two-layer barrier walls 3 of 120 μm in height, 50 μm in top width and 100 μm in bottom width arranged at pitches of 250 μm.

Subsequently, fluorescent layers 10 were formed in spaces between the adjacent two-layer barrier walls 3 to complete a back plate 2. The back plate 2 was combined with a separately fabricated front panel 1 to form a PDP. The PDP was capable of displaying images in satisfactory contrast and had a high luminance efficiency.

EXAMPLE 2

A barrier layer forming paste of a composition C and a barrier layer forming paste of a composition D were spread simultaneously on a PET film 24 by a slot die coater similar to that employed in fabricating Example 1 to form a transfer sheet 25 provided with a two-layer laminated barrier film consisting of two barrier layers, namely, a white barrier layer 22, and a black barrier layer 23 underlying the white barrier layer 22. The extrusion rate and the coating speed of the slot die coater were regulated so that the white barrier layer 22 and the black barrier layer 23 after drying were 150 μm and 50 μm in thickness, respectively.

Composition C (White barrier layer 22)

Frit: "MB-008", Matunami Glass Industry 65 Parts by wt.

Filler (alumina): "RA-40", Iwatani Chemical Industry 10 Parts by wt.

Pigment: "MT-500B" (TiO$_2$), Tayca 10 Parts by wt.

Binder: N-butyl methacrylate/2-hydroxyethyl methacrylate copolymer, 8 Parts by wt.

Plasticizers: Bis(2-ethylhexyl) phthalate, 5 Parts by wt, dimethyl phthalate, 5 Parts by wt.

Solvent: Propylene glycol monomethyl ether, 12 Parts by wt.

Composition D (Black barrier layer 23)

Frit: "MB-008", Matunami Glass Industry 65 Parts by wt.

Filler (alumina): "RA-40", Iwatani Chemical Industry 10 Parts by wt.

Pigment: "Daipirokisaido Black #9510", Dainichiseika Color & Chemicals MFG 10 Parts by wt.

Binder: N-butyl methacrylate/2-hydroxyethyl methacrylate copolymer, 8 Parts by wt.

Plasticizers: Bis(2-ethylhexyl) phthalate, 5 Parts by wt, dimethyl phthalate, 5 Parts by wt.

Solvent: Propylene glycol monomethyl ether, 12 Parts by wt.

Solvent: Propylene glycol monomethyl ether, 12 Parts by wt.

The transfer sheet 25 was placed on a glass substrate 2 provided with address electrodes 8 and a dielectric layer 9 with the white barrier layer 22 in contact with the surface of the dielectric layer 9, and then the white barrier layer 22 and the black barrier layer 23 were laminated to the glass substrate 2 by a thermocompression bonding process using an autocut laminator "ACL-9100" (Asahi Chemical Industry). In the thermocompression bonding process, the glass substrate 2 was heated at 80° C., and the barrier layers 22 and 23 were transferred from the transfer sheet 25 to the glass substrate 2 by pressing the transfer sheet 25 with a laminating roller heated at 100° C. Then, the glass substrate 2 provided with the barrier layers 22 and 23, namely, a workpiece, was subjected to a preparatory burning process, in which the glass substrate was heated at temperatures in the range of 280 to 290° C. to remove the plasticizers.

Then, the workpiece was subjected to a sandblasting mask forming process, a sandblasting process for patterning, and a burning process, which were similar to those employed in fabricating the back panel in Example 1. Thus, two-layer barrier walls 3 were completed. Subsequently, fluorescent layers 10 were formed in spaces between the adjacent two-layer barrier walls 3 to complete a back plate 2. The back plate 2 was combined with a separately fabricated front panel 1 to form a PDP. The PDP was capable of displaying images in satisfactory contrast and had a high luminance efficiency.

As is apparent from the foregoing description, the first embodiment of the present invention has the following effects.

According to the present invention, a plurality of layers are formed on a glass substrate by simultaneously spreading a plurality of kinds of thick film forming pastes on the glass substrate or by forming a plurality of layers on a transfer base film by simultaneously spreading a plurality of kinds of thick film forming pastes on the transfer base film, and by transferring the plurality of layers from the transfer base film to the glass substrate. Then, at least one of the plurality of layers is patterned and then the plurality of layers are burned simultaneously. Then, the plurality of layers to be patterned can be simultaneously formed by a single coating process, so that the patterned thick laminated film forming method has a relatively small number of processes and is capable of forming a patterned thick film at a relatively low cost.

Second Embodiment

A patterned thick laminated film forming method in a second embodiment according to the present invention will be described with reference to FIGS. 4 to 6, in which parts like or corresponding to those shown in FIGS. 1 to 3 are designated by the same reference characters and the description thereof will be omitted. This patterned thick laminated film forming method uses a barrier layer forming transfer sheet 31 shown in FIG. 4 to fabricate the PDP shown in FIG. 1.

Figure 4:
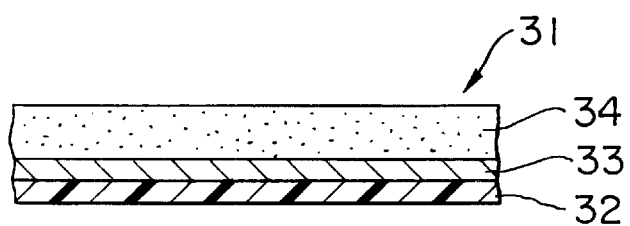
FIG. 4 is a fragmentary typical sectional view of a barrier forming transfer sheet.
Figure 5:
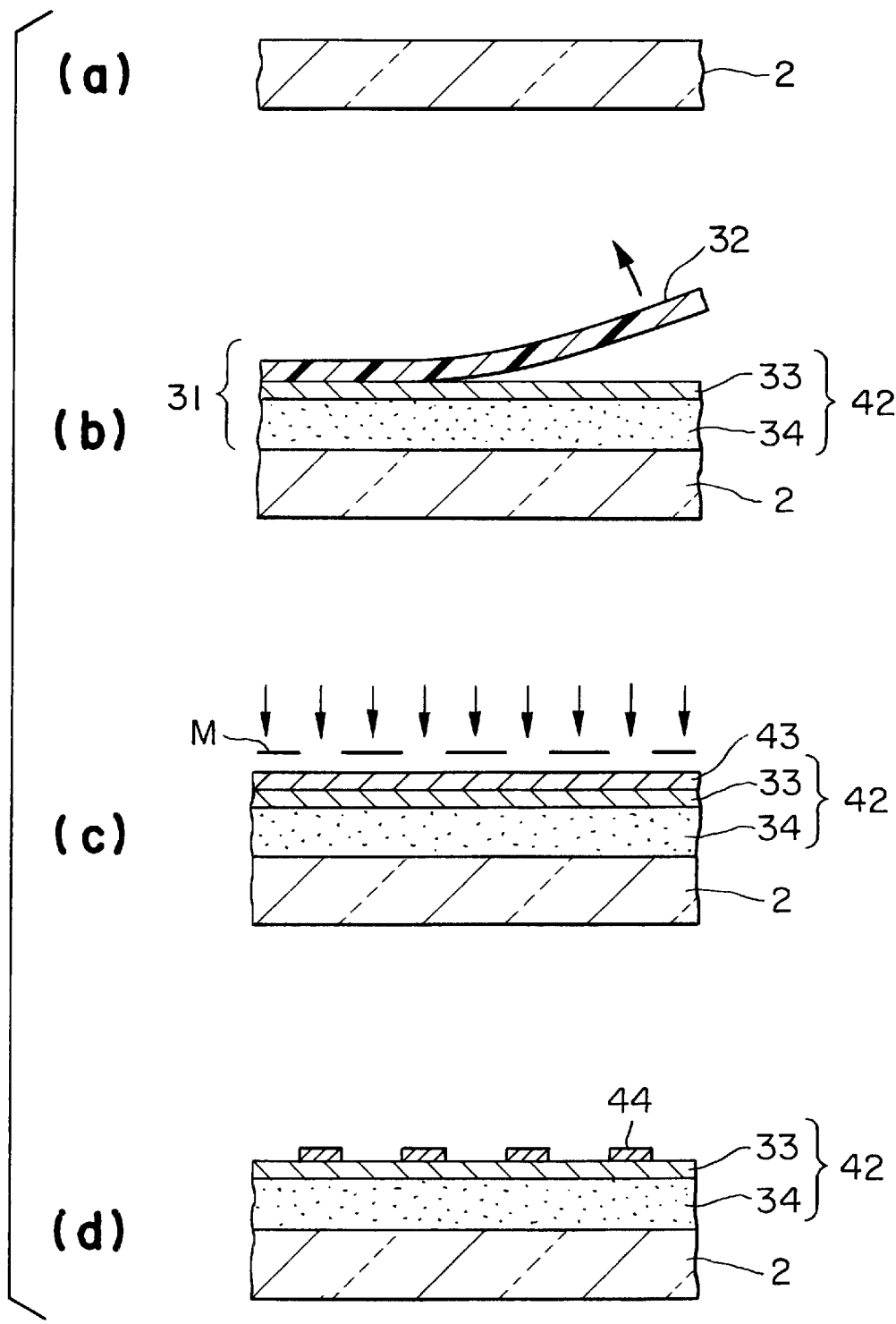
FIGS. 5(a), 5(b), 5(c) and 5(d) are fragmentary typical sectional views of assistance in explaining a procedure for forming barrier walls on a glass substrate by using the barrier forming transfer sheet.

Referring to FIG. 4 the barrier layer forming transfer sheet 31 is fabricated by spreading a black barrier layer forming paste in a black barrier layer 33 on a transfer base film 32, drying the black barrier layer 33, and spreading a white barrier layer forming paste in a white barrier layer 34 over the black barrier layer 33 after the black barrier layer 33 has been dried. When the barrier layers 33 and 34 are transferred from the barrier layer forming transfer sheet 31 to a glass substrate 2, the black barrier layer 33 overlies the white barrier layer 34. Two barrier layer forming transfer sheets, namely, a black barrier layer forming transfer sheet formed by spreading a black barrier layer forming paste on a transfer base film in a black barrier layer and a white barrier layer forming transfer sheet formed by spreading a white barrier layer forming paste on a transfer base film in a white barrier layer, may be used instead of the barrier layer forming transfer sheet 31 provided with the two barrier layers 33 and 34.

Films suitable for use as the transfer base film 32 of the barrier layer forming transfer sheet 31 are PET films, polyethylene films, polyester films, polyimide films, polyamide films, polytetrafluoroethylene films and the like. PET films are most preferable for their low costs.

A barrier layer forming mixture is prepared by mixing a low-melting frit containing PbO as a principal component, a refractory filler for stabilizing the shape of barrier layers for forming the barrier walls during burning, and a resin, namely, a binder. A pigment for coloring and, if necessary, a solvent and additives are added to the barrier layer forming mixture to prepare a barrier layer forming paste.

When preparing the barrier layer forming paste, a mixture of a low-melting frit powder, a refractory filler, a binder and a solvent is pulverized and mixed by a ball mill. A mixture is prepared by mixing inorganic components, i.e., the low-melting frit powder and the refractory filler, in a vehicle prepared by dissolving the binder in the solvent and, if necessary, adding additives to the dissolved binder, and then the mixture is processed by a ball mill. When processing the mixture by a ball mill, ceramic balls are used and, preferably, a ball mill provided with a cylinder having an inner surface coated with a ceramic material or a plastic material is employed to avoid mixing impurities in the mixture. After being pulverized by the ball mill, the mixture is kneaded by a roll mill provided with three rollers. If necessary, the kneaded mixture is defoamed in a vacuum by a vacuum mixer.

Each of the barrier layer forming paste is applied to the transfer base film 32 preferably by a screen printing process, a die coating process, a blade coating process, a comma coating process, a reverse roll coating process, a spray coating process, a gun coating process, an extrusion coating process or a lip coating process. The black barrier layer forming paste and the white barrier layer forming paste may be simultaneously applied to the transfer base film 32 by a multilayer coating apparatus capable of simultaneously forming a plurality of layers, such as a slot die coater, to form the black barrier layer 33 and the white barrier layer 34 simultaneously on the transfer base film 32.

It is preferable to finish the transfer base film 32 with an antistatic material by an antistatic treatment because the insulating transfer base film 32 is liable to be charged when an insulating layer, such as the barrier layer, is formed on the transfer base film 32. The antistatic material may be one of generally known antistatic materials, such as surface active agents, polymeric materials having hydrophilic groups, paint and conductive thin films.

The patterned thick laminated film forming method will be described with reference to FIGS. 5 and 6 as applied to fabricating barrier walls 3 on a back plate 2 of an ac-drive PDP as shown in FIG. 1.

As shown in FIG. 5(a) a glass substrate 2 having uniform transparency and thickness is prepared. The glass substrate 2 may be a float glass plate. The glass substrate 2 is made of, for example, a glass containing $Al_2O_3$, MgO and CaO as principal components, and $Na_2O$, $K_2O$, PbO and $B_2O_3$ as secondary components.

If necessary, a thin base layer 11 of a low-melting glass is formed on the inner surface of the glass substrate 2. It is preferable to form the base layer 11 to prevent the diffusion of alkaline components of the glass substrate 2 or to enhance the adhesion of address electrodes 8, a dielectric layer 9 and barrier walls 3 to the glass substrate 2. The address electrodes 8 are formed on the base layer 11 by a screen printing process, a photolithographic process, a filling process or a sandblasting process by processing an electrode forming paste prepared by dispersing a low-melting frit containing Ag, Ni, Cu or an alloy of one of those metals in a binder, such as a resin capable of being burned at a low temperature. If necessary, the address electrodes 8 are coated with a dielectric layer 9. It is preferable to form the dielectric layer 9 to ensure driving stability. A low-melting glass containing lead oxide and bismuth oxide is a suitable material for forming the dielectric layer 9.

After thus forming the base layer 11, the address electrodes 8 and the dielectric layer 9 on the glass substrate 2, two-layer barrier walls 3 each consisting of a white back section 3a and a black front section 3b are formed on the dielectric layer 9. In FIGS. 5 and 6, the base layer 11, the address electrodes 8 and the dielectric layer 9 formed on the glass substrate 2 are omitted for convenience.

Barrier layers 33 and 34 are formed on the glass substrate 2. If the barrier layer forming transfer sheet 31 shown in FIG. 4 is used, a laminated barrier film 42 consisting of the laminated barrier layers 33 and 34 is formed by transfer printing on the glass substrate 2 by laminating the barrier layer forming transfer sheet 31 to the glass substrate 2 and then peeling off the transfer base film 32 as shown in FIG. 5(b). If barrier layer forming transfer sheets respectively provided with the white barrier layer 34 and the black barrier layer 33 are used, the white barrier layer 34 and the black barrier layer 33 are transferred in that order from the barrier layer forming transfer sheets to the glass substrate to build the laminated barrier film 42 consisting of the white barrier layer 34 and the black barrier layer 33.

Then, as shown in FIG. 5(c), a dry resist film 43 is laminated to the two-layer laminated barrier film 42, and the dry resist film 43 is exposed to ultraviolet rays through a mask M of a desired pattern. Subsequently, an latent image formed on the dry resist film 43 is developed to form a sandblasting resist mask 44 as shown in FIG. 5(d).

Then, the two-layer laminated barrier film 42 is processed for patterning by a sandblasting process using the sandblasting resist mask 44. Consequently, unnecessary portions of the two-layer laminated barrier film 42 are removed and two-layer barrier walls 3 each consisting of a white back section 3a and a black front section 3b are formed as shown in FIG. 6(b). Subsequently, the sandblasting resist mask 44 is peeled off, and then the glass substrate 2 provided with the two-layer barrier walls 3 is subjected to a burning process to complete the two-layer barrier walls 3 each consisting of the white back section 3a and the black front section 3b. The height of the barrier walls 3 after burning is in the range of 100 to 200 $\mu$m.

An example of the second embodiment will be described hereinafter.

A barrier forming transfer sheet 31 provided with a two-layer laminated barrier film 42 was fabricated by applying a black barrier layer forming paste of a composition A on a transfer base film 32, i.e., a 50 $\mu$m thick PET film, by a die coater in a black barrier layer 33, drying the black barrier layer 33 at 170° C., applying a white barrier layer forming paste of a composition B to the black barrier layer in a white barrier layer 34 by a slot die coater and drying the white barrier layer 34 at 170° C. The extrusion rate of the slot die coater was regulated so that the black barrier layer 33 and the white barrier layer 34 after drying were 50 $\mu$m and 150 $\mu$m in thickness, respectively.

Composition A (Black barrier layer 33)
- Frit: "MB-008", Matunami Glass Industry 65 Parts by wt.
- Filler (alumina): "RA-40", Iwatani Chemical Industry 10 Parts by wt.
- Pigment: "Daipirokisaido Black #9510", Dainichiseika Color & Chemicals MFG 10 Parts by wt.
- Binder: N-butyl methacrylate/2-hydroxyethyl methacrylate copolymer, 8 Parts by wt.
- Plasticizers: Bis(2-ethylhexyl) phthalate, 5 Parts by wt, dimethyl phthalate, 5 Parts by wt.
- Solvent: Propylene glycol monomethyl ether, 12 Parts by wt.

Composition B (White barrier layer 34)
- Frit: "MB-008", Matunami Glass Industry 65 Parts by wt.
- Filler (alumina): "RA-40", Iwatani Chemical Industry 10 Parts by wt. 10 Parts by wt.
- Pigment: "MT-500B" ($TiO_2$), Tayka 10 Parts by wt.
- Binder: N-butyl methacrylate/2-hydroxyethyl methacrylate copolymer, 8 Parts by wt.
- Plasticizers: Bis(2-ethylhexyl) phthalate, 5 Parts by wt, dimethyl phthalate, 5 Parts by wt.
- Solvent: Propylene glycol monomethyl ether, 12 Parts by wt.
- Solvent: Propylene glycol monomethyl ether, 12 Parts by wt.

The barrier layer forming transfer sheet 31 was placed on a glass substrate 2 provided with address electrodes 8 and a dielectric layer 9 with the white barrier layer 34 in contact with the surface of the dielectric layer 9, and then the white barrier layer 34 and the black barrier layer 33 were laminated to the glass substrate 2 by a thermocompression bonding process using an autocut laminator "ACL-9100" (Asahi Chemical Industry). In the thermocompression bonding process, the glass substrate 2 was heated at 80° C., and the barrier layers 33 and 34 were transferred from the transfer sheet 25 to the glass substrate 2 by pressing the transfer base sheet 32 with a laminating roller heated at 100° C. and at a transfer speed of 2 m/min. Then, the glass substrate 2 provided with the two-layer laminated barrier film 42, namely, a workpiece, was subjected to a preparatory burning process, in which the glass substrate 2 was heated at temperatures in the range of 280 to 290° C. to remove the plasticizers.

The glass substrate 2 provided with the white barrier layer 34 and the black barrier layer 33, namely, a workpiece, was heated at 80° C., a dry resist film ("BF-603", Tokyo Ohka Kogyo) was laminated to the black barrier layer 33, and the dry resist film was exposed to ultraviolet rays of 365 nm in wavelength and 5 mW/cm$^2$ in intensity at a dose of 400 mJ/cm$^2$ through a mask M provided with 80 $\mu$m wide lines arranged at pitches of 250 $\mu$m. Subsequently, a latent image formed on the dry resist film was developed by a spray developing process using a 0.2% by weight sodium carbonate solution of 30° C. to form a sandblasting mask 44 having 80 $\mu$m wide lines arranged at pitches of 250 $\mu$m.

The glass substrate 2 provided with the barrier layers 33 and 34 and the sandblasting mask 44, i.e., the workpiece, was kept at a room temperature for 24 hr for drying, and then the workpiece was subjected to a sandblasting process to remove unnecessary portions of the white barrier layer 34 and the black barrier layer 33. Conditions for the sandblasting process were abrasive: "OF#800", Fujimi Inc., blasting rate: 100 g/min, blasting pressure: 2 kgf/cm$^2$, distance between the glass substrate and the blast nozzle: 120 mm, and nozzle scanning speed: 100 mm/sec. After completing the sandblasting process, the sandblasting mask 44 was removed by a spray removing process using a 1% by weight sodium hydroxide solution. Then, workpiece was subjected to a burning process, in which the remaining portions of the barrier layers 33 and 34 were burned at temperatures having a peak temperature of 580° C. for 15 min to complete two-layer barrier walls 3 of 120 $\mu$m in height, 50 $\mu$m in top width and 100 $\mu$m in bottom width arranged at pitches of 250 $\mu$m.

Subsequently, fluorescent layers 10 were formed in spaces between the adjacent two-layer barrier walls 3 to complete a back plate 2. The back plate 2 was combined with a separately fabricated front panel 1 to form a PDP. The PDP was capable of displaying images in satisfactory contrast and had a high luminance efficiency.

As is apparent from the foregoing description, the patterned thick laminated film forming method according to the present invention forms the two-layer laminated barrier film 42 on the glass substrate 2 by transferring the two-layer laminated barrier film 42 from the barrier layer forming transfer sheet 31 to the glass substrate 2, and forms the barrier walls by patterning the two-layer laminated barrier film 42 by the sandblasting process. Therefore, the patterned thick laminated film forming method of the present invention needs less steps than the conventional patterned thick laminated film forming method which builds the two-layer laminated barrier film 42 by separately forming the component barrier layers by a screen printing process.

What is claimed is:

1. A transfer sheet for producing layers for a plasma display panel on a substrate comprising:
    a transfer base film to be peeled off the substrate, having an entirely flat surface; and
    a thick laminated film to be transferred to the substrate, provided on the entirely flat surface of the transfer base film, said thick laminated film comprising a plurality of component layers of thick film forming materials, formed by applying a plurality of thick film forming pastes to the transfer base film, said component layers comprising
        barrier layers for a plasma display panel, and each of said component layers having an entire flat surface without any patterns.

2. A transfer sheet according to claim 1, wherein said barrier layers comprise:
    (i) a black barrier layer on the transfer base film, and
    (ii) a white barrier layer on the black barrier layer.

3. A transfer sheet according to claim 1, comprising:
    a transfer base film; and
    a thick laminated film on the transfer base film, said thick laminated film comprising a plurality of component layers of thick film forming materials, formed by applying a plurality of thick film forming pastes to the transfer base film, said component layers comprising:
        (i) a black barrier layer on the transfer base film,
        (ii) a white barrier layer on the black barrier layer, and
        (iii) a dielectric layer on the white barrier layer.

4. The transfer sheet according to claim 3, wherein at least one component layer of the thick laminated film is patterned in a desired pattern.

5. A transfer sheet according to claim 3, comprising:
    a transfer base film; and
    a thick laminated film on the transfer base film, said thick laminated film comprising a plurality of component layers of thick film forming materials, formed by applying a plurality of thick film forming pastes to the transfer base film, said component layers comprising:
        (i) a barrier layer on the transfer base film, and
        (ii) a dielectric layer on the barrier layer.

6. The transfer sheet according to claim 5, wherein at least one component layer of the thick laminated film is patterned in a desired pattern.

* * * * *